(12) United States Patent
Ga et al.

(10) Patent No.: US 10,933,705 B2
(45) Date of Patent: Mar. 2, 2021

(54) APPARATUS AND METHOD FOR MONITORING TIRE PRESSURE OF VEHICLE

(71) Applicants: HYUNDAI MOTOR COMPANY, Seoul (KR); KIA MOTORS CORPORATION, Seoul (KR)

(72) Inventors: Han Seon Ga, Gwangmyeong-si (KR); Joon Sang Jo, Yongin-si (KR); Hyun Dong Her, Seoul (KR); Myung Ki Yeom, Incheon (KR); Ju Yong Kang, Hanam-si (KR)

(73) Assignees: Hyundai Motor Company, Seoul (KR); KIA Motors Corporation, Seoul (KR)

( * ) Notice: Subject to any disclaimer, the term of this patent is extended or adjusted under 35 U.S.C. 154(b) by 33 days.

(21) Appl. No.: 16/361,827

(22) Filed: Mar. 22, 2019

(65) Prior Publication Data

US 2020/0122530 A1 Apr. 23, 2020

(30) Foreign Application Priority Data

Oct. 17, 2018 (KR) .......................... 10-2018-0123987

(51) Int. Cl.
*B60C 23/00* (2006.01)
*B60C 23/06* (2006.01)
*B60C 23/04* (2006.01)

(52) U.S. Cl.
CPC ........ *B60C 23/062* (2013.01); *B60C 23/0488* (2013.01)

(58) Field of Classification Search
CPC .......................... B60C 23/062; B60C 23/0488
See application file for complete search history.

(56) References Cited

U.S. PATENT DOCUMENTS

| | | | |
|---|---|---|---|
| 8,573,045 B2 | 11/2013 | Gotschlich | |
| 2003/0201879 A1* | 10/2003 | Munch | B60C 23/0408 340/442 |
| 2005/0194078 A1* | 9/2005 | Ogawa | B60C 23/0408 152/415 |
| 2013/0006440 A1* | 1/2013 | Petrucci | B60T 8/172 701/1 |
| 2016/0347129 A1* | 12/2016 | Yamashita | B60Q 9/00 |
| 2016/0375735 A1* | 12/2016 | Kim | B60C 23/062 702/50 |
| 2019/0255893 A1* | 8/2019 | Van Wiemeersch | G07C 5/008 |
| 2020/0171891 A1* | 6/2020 | Patel | B60C 23/0416 |

FOREIGN PATENT DOCUMENTS

WO  WO2006-132784 A1  12/2006

* cited by examiner

*Primary Examiner* — Jamel E Williams
(74) *Attorney, Agent, or Firm* — Brinks Gilson & Lione

(57) ABSTRACT

An apparatus and a method for monitoring a tire pressure of a vehicle are provided. The apparatus for monitoring a tire pressure of a vehicle according to the present disclosure includes a first sensor configured for measuring a tire pressure of one of first to fourth wheels of the vehicle, a plurality of second sensors configured for respectively measuring wheel speeds of the first to fourth wheels, an analysis device configured for analyzing tire pressures of the first to fourth wheels based on a measured value from the first sensor and measured values from the second sensors, and a controller configured for determining a tire in a low-pressure state based on the tire pressure analysis results of the first to fourth wheels.

17 Claims, 21 Drawing Sheets

| NUMBER OF TIRES IN LOW-PRESSURE STATE | WHEEL IN LOW-PRESSURE STATE | | | | WHEEL SPEED DIFFERENCE COMPARISON | | |
|---|---|---|---|---|---|---|---|
| | FL | FR | RL | RR | FRONT/REAR | LEFT/RIGHT | DIAGONAL |
| NORMAL | | | | | ○ | ○ | ○ |
| ONE TIRE IN LOW-PRESSURE STATE | ● | | | | + | + | + |
| | | ● | | | + | − | − |
| | | | ● | | − | + | − |
| | | | | ● | − | − | + |
| TWO TIRES IN LOW-PRESSURE STATE | ● | ● | | | + | ○ | ○ |
| | | | ● | ● | − | ○ | ○ |
| | ● | | | ● | ○ | ○ | + |
| | | ● | ● | | ○ | ○ | − |
| | ● | | ● | | − | + | − |
| | | ● | | ● | ○ | − | ○ |
| THREE TIRES IN LOW-PRESSURE STATE | ● | ● | ● | | + | + | − |
| | ● | ● | | ● | + | − | + |
| | ● | | ● | ● | − | + | + |
| | | ● | ● | ● | − | − | − |

FIG.5

APPARATUS AND METHOD FOR MONITORING TIRE PRESSURE OF VEHICLE

CROSS-REFERENCE TO RELATED APPLICATION

This application claims priority to and the benefit of Korean Patent Application No. 10-2018-0123987, filed in the Korean Intellectual Property Office on Oct. 17, 2018, which is incorporated herein by reference in its entirety.

TECHNICAL FIELD

The present disclosure relates to an apparatus and a method for monitoring a tire pressure of a vehicle.

BACKGROUND

The statements in this section merely provide background information related to the present disclosure and may not constitute prior art.

There are direct and indirect manners for measuring a tire pressure.

The direct manner is to directly measure the tire pressure by placing four tire pressure sensors on each wheel.

However, the tire pressure sensor is expensive so that it may cost a lot and an error may occur due to a sensor error.

On the other hand, the indirect manner is to place four wheel-speed sensors on each of the wheels, and to estimate the tire pressure through dynamic radius analysis and frequency analysis based on a wheel speed.

The indirect manner may save money, but it is less accurate.

SUMMARY

The present disclosure provides an apparatus and a method for monitoring a tire pressure of a vehicle that may monitor a low-pressure state of a tire precisely by monitoring the tire pressure using a single tire pressure sensor and a plurality of wheel-speed sensors.

The technical problems to be solved by the present inventive concept are not limited to the aforementioned problems, and any other technical problems not mentioned herein will be clearly understood from the following description by those skilled in the art to which the present disclosure pertains.

According to an aspect of the present disclosure, an apparatus for monitoring a tire pressure of a vehicle comprises a first sensor configured for measuring a tire pressure of one of first to fourth wheels of the vehicle, a plurality of second sensors configured for respectively measuring wheel speeds of the first to fourth wheels, an analysis device configured for analyzing tire pressures of the first to fourth wheels based on a measured value of the first sensor and measured values of the second sensors, and a controller configured for determining a tire in a low-pressure state based on tire pressure analysis results of the first to fourth wheels.

In one form of the present disclosure, the first sensor is disposed on the first wheel of the vehicle to measure the tire pressure of the first wheel.

In one form of the present disclosure, the first wheel is one of two rear wheels of the vehicle.

In one form of the present disclosure, the plurality of second sensors are respectively disposed on the first to fourth wheels to measure the wheel speeds of the corresponding wheels.

In one form of the present disclosure, the apparatus for monitoring a tire pressure of a vehicle further comprises a determination device configured for determining whether the measured value from the first sensor is valid or invalid.

In one form of the present disclosure, the determination device determines the validity or invalidity of the measured value from the first sensor based on a range of the measured value of the first sensor, a battery condition of the first sensor, a wireless signal intensity of the first sensor, a difference value between a previously measured value and the measured value of the first sensor, and a wheel-speed sensor value.

In one form of the present disclosure, when a measurement range of the measured value of the first sensor is within a range from the first reference value to a second reference value, when a battery residual quantity exceeds a third reference value, when a wireless signal intensity exceeds a fourth reference value, when the difference value between the previously measured value and the measured value from the first sensor is below a fifth reference value, and when a difference between a wheel speed estimated based on a signal of the first sensor and an actual wheel-speed sensor value is below a sixth reference value, the determination device determines that the measured value of the first sensor is valid.

In one form of the present disclosure, the analysis device compares wheel speed differences in a front and rear direction, a left and right direction, and a diagonal direction between the first to fourth wheels, and analyzes the tire pressure states of the first to fourth wheels based on the comparison result.

In one form of the present disclosure, the analysis device analyzes rotation frequencies of the front third and fourth wheels of the vehicle.

In one form of the present disclosure, upon determination that the measured value from the first sensor is valid, the controller determines a tire pressure state of the first wheel based on the measured value from the first sensor.

In one form of the present disclosure, when the tire pressure state of the first wheel is determined, the controller determines tire pressure states of the second to fourth wheels based on wheel speed differences between the first to fourth wheels based on the tire pressure state of the first wheel.

In one form of the present disclosure, upon determination that the measured value of the first sensor is invalid, the controller determines tire pressure states of the first to fourth wheels based on wheel speed differences between the first to fourth wheels, and based on rotation frequencies of the front third and fourth wheels of the vehicle.

In one form of the present disclosure, the apparatus for monitoring a tire pressure of a vehicle further comprises output configured for, upon determination that a tire of at least one of the first to fourth wheels is in a low-pressure state, outputting the tire low-pressure state of the corresponding wheel.

According to an aspect of the present disclosure, a method for monitoring a tire pressure of a vehicle comprises measuring a tire pressure of one of first to fourth wheels by a first sensor, measuring wheel speeds of the first to fourth wheels by a plurality of second sensors, analyzing tire pressures of the first to fourth wheels based on measured values from the first and second sensors, and determining a tire in a low-pressure state based on the tire pressure analysis result of the first to fourth wheels.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which:

FIG. 3A to FIG. 6 illustrate forms for describing a tire low-pressure analysis operation of an apparatus for monitoring a tire pressure of a vehicle in one form of the present disclosure.

Figure 1:
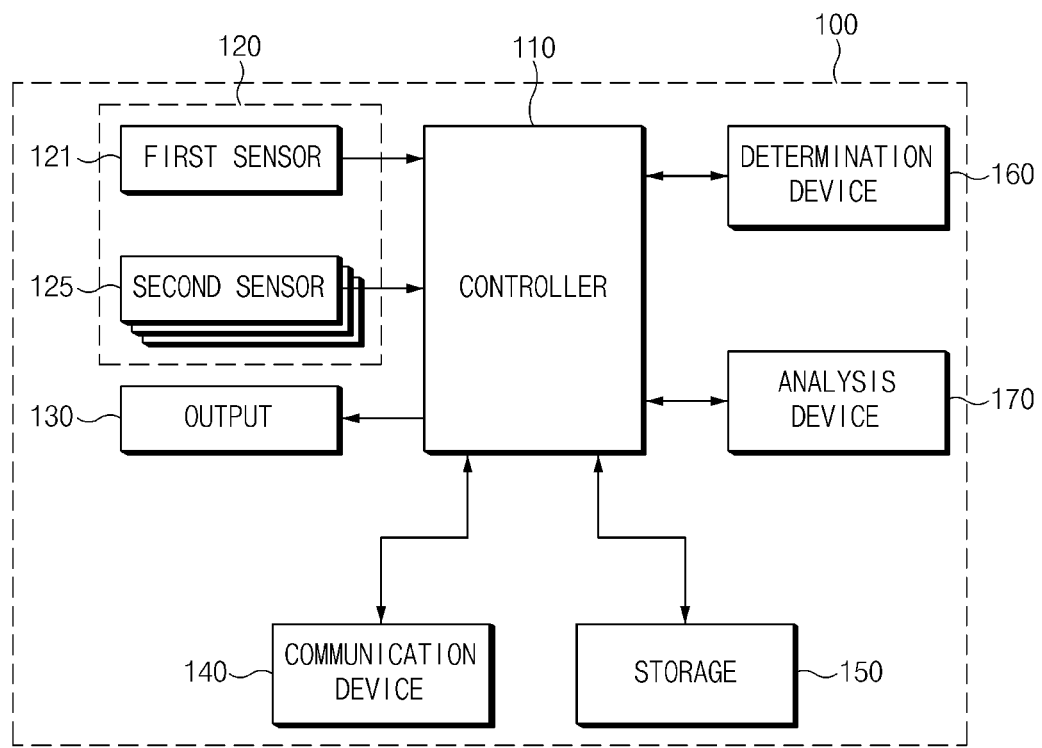
FIG. 1 is a diagram illustrating a configuration of an apparatus for monitoring a tire pressure of a vehicle in one form of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

FIG. 1 is a diagram illustrating a configuration of an apparatus for monitoring a tire pressure of a vehicle in some forms of the present disclosure.

An apparatus 100 according to the present disclosure may be implemented inside a vehicle. In this connection, the apparatus 100 may be integrally formed with internal control units of the vehicle, or may be implemented as a separate device and connected to the control units of the vehicle via separate connecting means.

With reference to FIG. 1, the apparatus 100 may include a controller 110, a sensor part 120, output 130, communication device 140, storage 150, a determination device 160, and an analysis device 170. In this connection, the controller 110, the determination device 160, and the analysis device 170 of the apparatus 100 in some forms of the present disclosure may be implemented as at least one processor.

The controller 110 may process a signal transmitted between the respective components of the apparatus 100.

The sensor part 120 may sense predetermined information for monitoring four tires provided on the vehicle, that is, tire pressures of first to fourth wheels. In this connection, the first wheel, which is a reference wheel, may be any one of two rear wheels of the vehicle. The second wheel may be the other of the two rear tires of the vehicle. Further, the third and fourth wheels may be two front wheels of the vehicle. Hereinafter, for convenience of explanation, the first wheel is described as a rear left wheel, the second wheel as a rear right wheel, the third wheel as a front left wheel, and the fourth wheel as a front right wheel.

In this connection, the sensor part 120 may include a first sensor disposed on any one of the first to fourth wheels provided on the vehicle to monitor a tire pressure of the corresponding wheel.

The sensor part 120 may further include four second sensors for monitoring wheel speeds of the first to fourth wheels, respectively.

Figure 2:
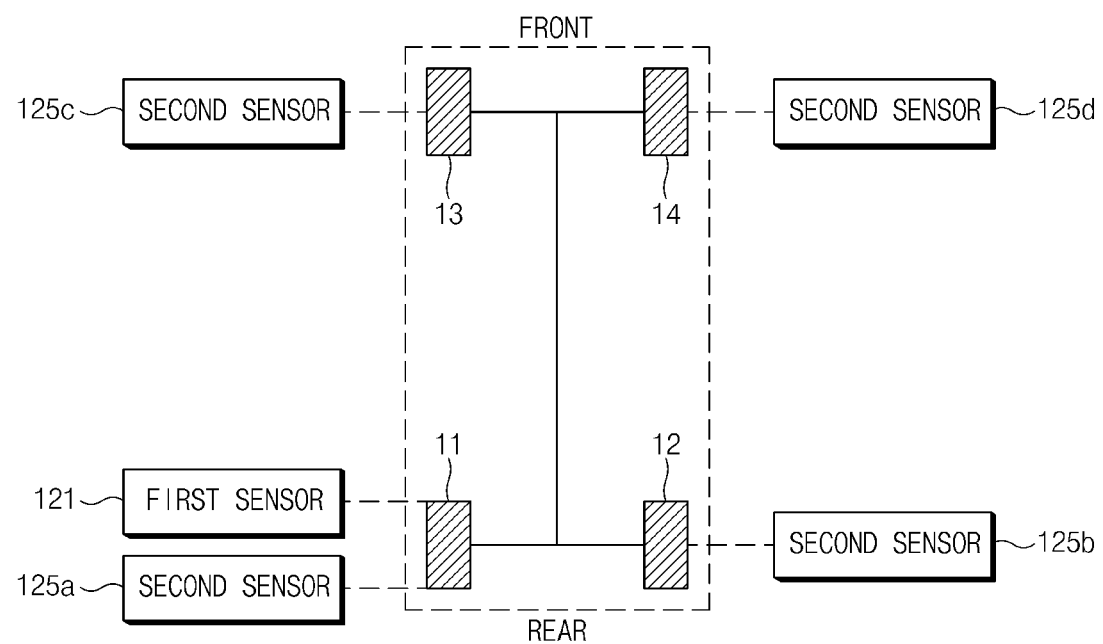
FIG. 2 is a diagram illustrating a sensor arrangement structure of an apparatus for monitoring a tire pressure of a vehicle in one form of the present disclosure.

An arrangement of the first sensor and the second sensors is represented with reference to FIG. 2.

FIG. 2 is a diagram illustrating a sensor arrangement structure of an apparatus for monitoring a tire pressure of a vehicle in some forms of the present disclosure. As shown in FIG. 2, the first sensor 121 is disposed on the first wheel 11, which is the reference wheel. The first sensor 121 may measure a tire pressure of the first wheel 11, and transmit the measurement of the tire pressure of the first wheel 11 to the controller 110.

The four second sensors 125a, 125b, 125c and 125d may be disposed on the first to fourth wheels 11, 12, 13 and 14 respectively. In this connection, the four second sensors 125a, 125b, 125c and 125d may measure the wheel speed of each of the wheels 11, 12, 13 and 14, and transmit the measurement of the wheel speed of each of the wheels 11, 12, 13 and 14 to the controller 110.

The output 130 may include one or more output for outputting an operation state, a result, and the like of the apparatus 100.

As an example, the output 130 may include a display to display the tire pressure states of the first to fourth wheels 11, 12, 13 and 14 and a warning message based on the low-pressure state of the tire. The output 130 may further include an instrument panel for lighting a warning lamp based on the low-pressure state of the tire. The output 130 may further include a speaker, a buzzer, and the like for outputting an alert sound based on the low-pressure state of the tire.

In this connection, the display may include at least one of a Liquid Crystal Display (LCD), a Thin Film Transistor-Liquid Crystal Display (TFT LCD), an Organic Light-Emitting Diode (OLED), a Flexible Display, a Feld Emission Display (FED), and a 3-Dimensional (3D) display.

The communication device 140 may include a communication module that supports a communication interface between electrical components and/or the control units provided in the vehicle. As an example, the communication module may include a module that supports a signal transmission/reception between the sensors and the respective control units provided at the vehicle. As an example, the communication module may include a module that supports a vehicle network communication such as a Controller Area Network (CAN) communication, a Local Interconnect Network (LIN) communication, and a Flex-Ray communication, and the like.

In addition, the communication module may include a module for a wireless internet access, or a module for a short-range communication. In this connection, a wireless Internet technology may include a wireless LAN (WLAN), a wireless broadband (Wibro), a Wi-Fi, a World Interoperability for Microwave Access (Wimax), and the like. A short-range communication technology may include a Bluetooth, a ZigBee, a Ultra Wideband (UWB), a Radio Frequency Identification (RFID), an infrared communication (Infrared Data Association (IrDA)), and the like.

The storage 150 may store data and/or an algorithm, or the like required for the apparatus 100 to operate.

As an example, the storage 150 may store information measured from the first sensor and/or the second sensors. In addition, the storage 150 may store an algorithm and/or an instruction for determining a validity or invalidity of a first sensor value by the determination device 160. Further, the storage 150 may store an algorithm and/or an instruction for analyzing the tire pressure states of the first to fourth wheels and determining the low-pressure state by the analysis device 170.

In this connection, the storage 150 may include a storage medium such as a random access memory (RAM), a static random access memory (SRAM), a read-only memory (ROM), a programmable read-only memory (PROM), an electrically erasable programmable read-only memory (EEPROM).

The controller 110 controls driving of the first sensor and the second sensor.

When the first sensor and the second sensors are driven, and sensor values measured by the first sensor and the second sensors are input, the controller 110 transmits the input sensor values to the determination device 160 and/or the analysis device 170.

The determination device 160 determines whether the first sensor value measured by the first sensor is valid or invalid.

In this connection, the determination device 160 may determine the validity or invalidity of the first sensor value based on a measurement range of the first sensor value, a battery condition of the first sensor, an intensity of a wireless signal of the first sensor, a difference value between a previously measured value and the first sensor value, and a wheel-speed sensor value.

First, the determination device 160 determines, as a first condition, whether the measurement range of the first sensor value falls within a range of a first reference value to a second reference value. For example, the first reference value may be the lowest measured value within a permissible range, and the second reference value may be the highest measured value within the permissible range.

In addition, the determination device 160 determines, as a second condition, whether a battery residual quantity is above a third reference value. When the battery residual quantity is equal to or below a reference quantity, it is impossible to know when the signal is to be turned off, and the wireless signal intensity may be weakened. Therefore, the determination device 160 may determine that the first sensor value is trustable only when the battery residual quantity is above the third reference value.

In addition, the determination device 160 determines, as a third condition, whether the wireless signal intensity is above the fourth reference value. When the wireless signal intensity is equal to or below a reference intensity, the signal may be highly affected by a noise. Thus, the determination device 160 may determine that the first sensor value is trustable only when the wireless signal intensity is above the fourth reference value.

In addition, the determination device 160, as a fourth condition, calls the first sensor value measured during a previous driving from the storage, and compares the previously measured first sensor value with the first sensor value. Then, the determination device 160 determines whether the difference value between the previously measured value and the first sensor value is within a fifth reference value.

Generally, the tire in a normal state is known that an air therein falls by 1% per month. Therefore, when the difference between the first sensor value and the previously measured value is too big, the tire may not be in the normal state. Thus, the determination device 160 may determine that the first sensor value is trustable only when the difference value between the first sensor value and the previously measured value is below the fifth reference value.

In addition, the determination device 160 may estimate the wheel speed value based on a signal intensity change of the first sensor value as a fifth condition. Then, the determination device 160 may determine whether a difference value between the actual wheel speeds measured by the second sensors and the estimated wheel speed is below a sixth reference value.

The wireless signal intensity of the first sensor is changed based on the wheel speed, thus a frequency varies. In this connection, a radius of the tire may be known by grasping a period from the varied frequency. Thus, the determination device 160 may estimate the wheel speed of the wheel coupled with the first tire through the change of the wireless signal intensity of the first sensor.

In this connection, when the difference value between the actual wheel speeds measured by the second sensors and the estimated wheel speed is the sixth reference value or above, an abnormality may have occurred in any one of the first sensor value and the second sensor values. Therefore, the valid value determination device 160 may determine that the first sensor value is trustable only when the difference value between the actual wheel speeds measured by the second sensors and the estimated wheel speed is below the sixth reference value.

As described above, the determination device 160 may determine that the first sensor value is valid when all of the first to fifth conditions are satisfied. In this connection, the determination device 160 may set a first sensor value valid flag to ON when the first sensor value is valid, and may set the valid flag to OFF when the first sensor value is invalid.

The determination device 160 may transmit the validity or invalidity determination result of the first sensor value to the controller 110.

The analysis device 170 analyzes the tire pressure states of the first to fourth wheels using the second sensor values respectively corresponding to the first to fourth wheels. In this connection, the analysis device 170 performs a dynamic radius analysis using the second sensor values respectively corresponding to the first to fourth wheels.

In this connection, the dynamic radius analysis is a manner of comparing wheel speed differences in a front and rear direction, a left and right direction, and a diagonal direction using that the wheel speed of the low-pressure tire wheel increases. Then, the tire pressure state of each of the wheels is analyzed based on the comparison result.

Some forms of the dynamic radius analysis are represented with reference to FIG. 3A to FIG. 5.

Figure 3A:
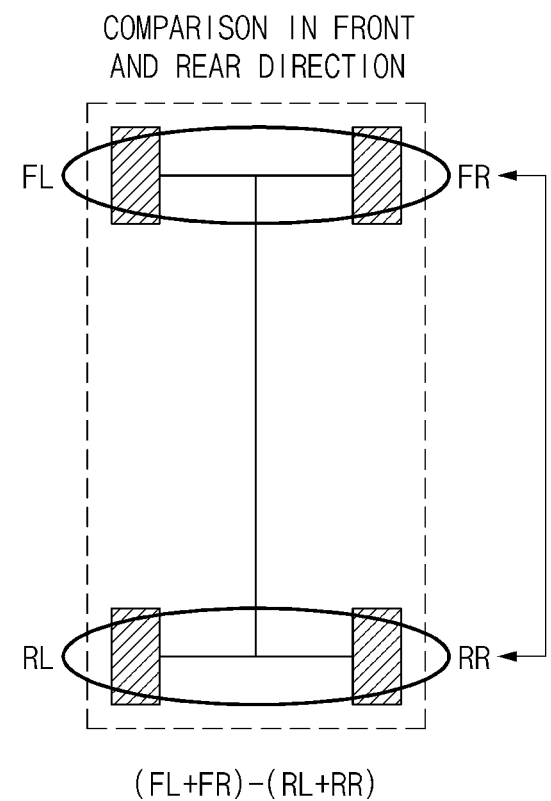

First, FIG. 3A shows a form of calculating the wheel speed difference in the front and rear direction.

As shown in FIG. 3A, the analysis device 170 calculates a difference ((FLFR)−(RL+RR)) between a sum of the wheel speeds of the front third and fourth wheels and a sum of the wheel speeds of the rear first and second wheels.

Figure 3B:
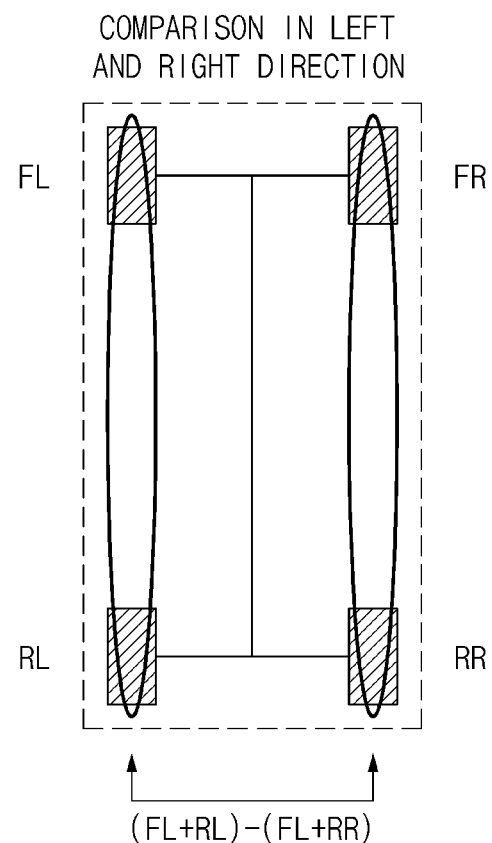

FIG. 3B shows a form of calculating the wheel speed difference in the left and right direction.

As shown in FIG. 3B, the analysis device 170 calculates a difference ((FL+RL)−(FR+RR)) between a sum of the wheel speeds of the left third and first wheels and a sum of the wheel speeds of the right fourth and second wheels.

Figure 3C:
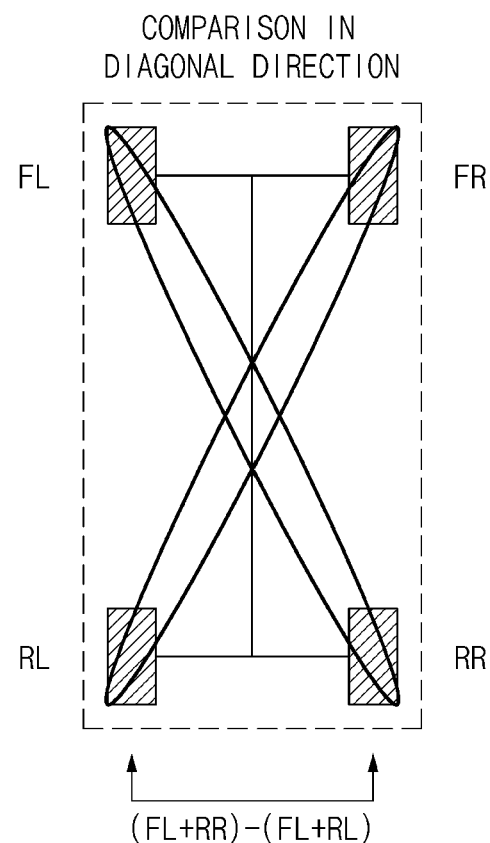

FIG. 3C shows a form of calculating the wheel speed difference in the diagonal direction.

As shown in FIG. 3C, the analysis device 170 calculates a difference ((FL+RR)−(FR+RL)) between a sum of the wheel speeds of the third and second wheels on a left diagonal and a sum of the wheel speeds of the fourth and first wheels on a right diagonal.

Figure 4:
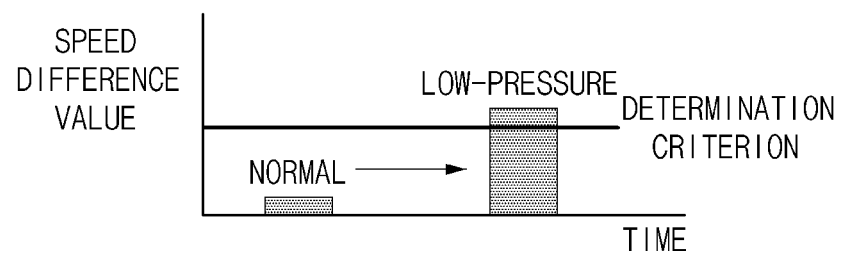

In this connection, as shown in FIG. 4, a wheel speed difference value of the normal wheel is below the reference value, but a wheel speed difference of the wheel in the low-pressure state is above or equal to the reference value because the wheel speed of the wheel in the low-pressure state increases.

Therefore, when the first to fourth wheels are all normal, as shown in FIG. 5, the wheel speed differences in the front and rear direction, in the left and right direction, and in the diagonal direction are all zero.

When the first wheel is in the low-pressure state, the wheel speed difference values in the front and rear direction and in the diagonal direction become '−' values, and the wheel speed difference value in the left and right direction becomes a '+' value. In addition, when the second wheel is in the low-pressure state, the wheel speed difference values in the front and rear direction and in the left and right direction become '−' values, and the wheel speed difference value in the diagonal direction becomes a '+' value. In addition, when the third wheel is in the low-pressure state, the wheel speed difference values in the front and rear direction, in the left and right direction, and in the diagonal direction all become '+' values. In addition, when the fourth wheel is in the low-pressure state, the wheel speed difference value in the front and rear direction becomes a '+' value, and the wheel speed difference values in the left and right direction and in the diagonal direction become '−' values.

In one example, when the first and second wheels are in the low-pressure states, only the wheel speed difference value in the front and rear direction becomes a '−' value, and the rest become 0. When the first and third wheels are in the low-pressure states, the wheel speed difference values in the front and rear direction and in the diagonal direction become '−' values, and the wheel speed difference value in the left and right direction becomes '+' value. When the first and fourth wheels are in the low-pressure states, only the wheel speed difference value in the diagonal direction becomes a '−' value, and the rest become 0. When the second and third wheels are in the low-pressure states, only the wheel speed difference value in the diagonal direction becomes a '+' value, and the rest become 0. When the second and fourth wheels are in the low-pressure states, only the wheel speed difference value in the left and right direction becomes a '−' value, and the rest become 0. When the third and fourth wheels are in the low-pressure states, only the wheel speed difference value in the front and rear direction becomes a '+' value, and the rest become 0.

In one example, when the first to third wheels are in the low-pressure states, the wheel speed difference value in the front and rear direction becomes a '−' value, and the wheel speed difference values in the left and right direction and in the diagonal direction become '+' values. In addition, when the first, second, and fourth wheels are in the low-pressure states, the wheel speed difference values in the front and rear direction, in the left and right direction, and in the diagonal direction all become '−' values. In addition, when the first, third, fourth wheels are in the low-pressure states, the wheel speed difference values in the front and rear direction, in the left and right direction become '+' values, and the wheel speed difference value in the diagonal direction becomes a '−' value. In addition, when the second to fourth wheels are in the low-pressure states, the wheel speed difference values in the front and rear direction and in the diagonal direction become '+' values, and the wheel speed difference value in the left and right direction becomes a '−' value.

The analysis device 170 estimates rotation frequencies of the front third and fourth wheels of the vehicle. In this connection, the analysis device 170 may estimate the rotation frequencies of the third and fourth wheels by applying a tire stiffness and the moment of inertia. Then, the analysis device 170 may analyzes the tire pressure states of the third and fourth wheels based on the estimated rotation frequencies.

A form of estimating the rotation frequencies of the third and fourth wheels is represented with reference to [Equation 1].

$$\text{frequency} = \sqrt{\frac{\text{tire stiffness}}{\text{the moment of inertia}}} \qquad \text{[Equation 1]}$$

Figure 6:
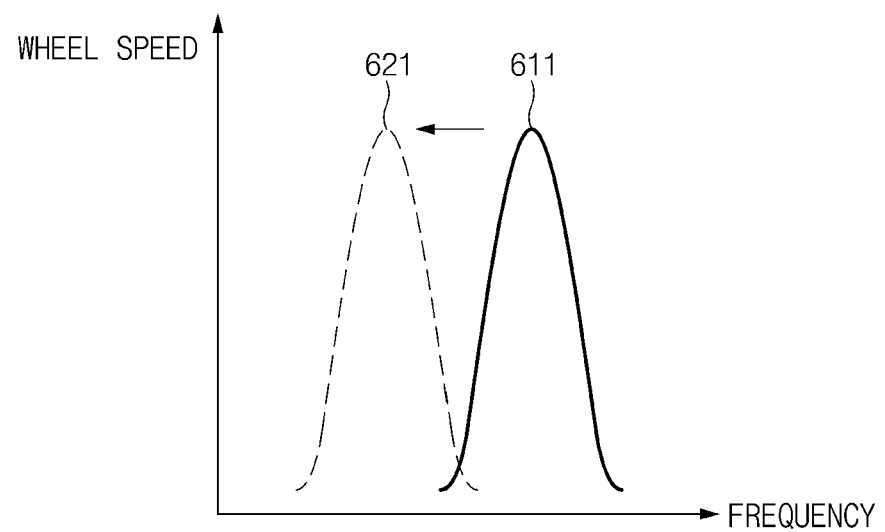

When the tire pressures of the third or fourth wheels are in the normal states, the estimated rotation frequency corresponding to the third or fourth wheel is the same as a graph 611 of FIG. 6.

On the other hand, when the tire pressures of the third or fourth wheels are in the low-pressure states, the estimated rotation frequency corresponding to the third or fourth wheel becomes below a reference frequency as shown in a graph 621 in FIG. 6.

The controller 110 determines a wheel coupled with the tire in the low-pressure state between the first to fourth wheels based on the validity or invalidity determination result of the first sensor value from the determination device 160, the first sensor value, the dynamic radius analysis result and/or the frequency analysis result of the first to fourth wheels from the analysis device 170.

First, the controller 110 checks whether the first sensor value valid flag is set to ON.

When the first sensor value valid flag is set to ON, the controller 110 may determine, from the first sensor value, that the tire of the first wheel is in the low-pressure state, and determine a wheel that is coupled with the low-pressure tire between the second to fourth wheels based on the tire pressure state of the first wheel.

When it is determined that the tire of the first wheel is not in the low-pressure state, the controller 110 may determine a wheel coupled with the tire in the low-pressure state between the first to fourth wheels from the dynamic radius analysis result and the frequency analysis result of the first to fourth wheels based on the tire pressure state of the first wheel.

On the other hand, when the first sensor value valid flag is set to OFF, the controller 110 may determine a wheel coupled with the tire in the low-pressure state between the first to fourth wheels based on the dynamic radius analysis result and the frequency analysis result, from the analysis device 170, of the first to fourth wheels.

When the wheel coupled with the tire in the low-pressure state is determined between the first to fourth wheels, the controller 110 generates a notification and/or a warning signal for the tire low-pressure state of the corresponding wheel, and outputs the same to the output.

The apparatus 100 in some forms of the present disclosure operating as described above may be implemented as an independent hardware device including a memory and a processor for processing each operation, and may be implemented in a form embedded in another hardware device such as a microprocessor or a general purpose computer system.

FIG. 7A to FIG. 8C illustrate some forms for describing a tire low-pressure state monitoring operation of an apparatus for monitoring a tire pressure of a vehicle in some forms of the present disclosure.

First, FIG. 7A to FIG. 7E illustrate some forms in which the first sensor value valid flag is set to ON, and the tire pressure of the first wheel 11 is in the low-pressure state.

Figure 7A:
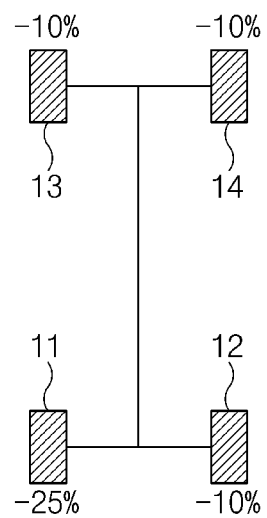
FIG. 7A to FIG. 8C illustrate forms for describing a tire low-pressure state monitoring operation of an apparatus for monitoring a tire pressure of a vehicle in one form of the present disclosure.

First, as shown in FIG. 7A, when the tire pressure of the first wheel 11 is in the low-pressure state of −25%, and the tire pressures of the remaining wheels 12, 13 and 14 are in the normal states of −10%, the apparatus 100 may confirm the tire low-pressure state of the first wheel 11 from the first sensor value. Further, the apparatus 100 may confirm that the remaining second to fourth wheels 12, 13 and 14 are in the normal states based on relative wheel speeds from the dynamic radius analysis result of the first to fourth wheels 11, 12, 13 and 14 using the tire low-pressure state of the first wheel 11 as a reference.

Figure 7B:
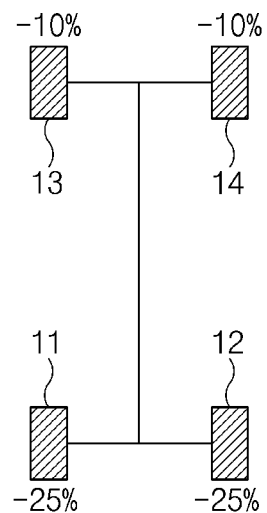

As shown in FIG. 7B, when the tire pressures of the first and second wheels 11 and 12 are in the low-pressure states of −25%, and the tire pressures of the remaining wheels 13 and 14 are in the normal states of −10%, the apparatus 100 may confirm the tire low-pressure state of the first wheel 11 from the first sensor value. Further, the apparatus 100 may confirm that the second wheel 12 is in the tire low-pressure state based on the dynamic radius analysis result, and the relative wheel speeds of the first and second wheels 11 and 12 using the tire low-pressure state of the first wheel 11 as a reference.

Figure 7C:
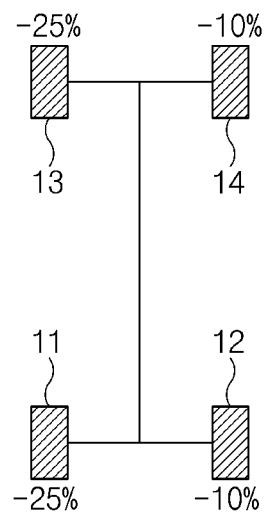

As shown in FIG. 7C, when the tire pressures of the first and third wheels 11 and 13 are in the low-pressure states of −25%, and the tire pressures of the remaining wheels 12 and 14 are in the normal states of −10%, the apparatus 100 may confirm the tire low-pressure state of the first wheel 11 from the first sensor value. Further, the apparatus 100 may confirm that the third wheel 13 is in the tire low-pressure state based on the dynamic radius analysis result of the first to fourth wheels 11, 12, 13 and 14, and the relative wheel speeds of the first and third wheels 11 and 13 using the tire low-pressure state of the first wheel 11 as a reference.

Figure 7D:
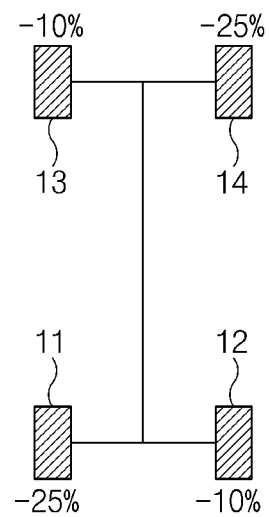

As shown in FIG. 7D, when the tire pressures of the first and fourth wheels 11 and 14 are in the low-pressure states of −25%, and the tire pressures of the remaining wheels 12 and 13 are in the normal states of −10%, the apparatus 100 may confirm the tire low-pressure state of the first wheel 11 from the first sensor value. Further, the apparatus 100 may confirm that the fourth wheel 14 is in the tire low-pressure state based on the dynamic radius analysis result of the first to fourth wheels 11, 12, 13 and 14, and the relative wheel speeds of the first and fourth wheels 11 and 14 using the tire low-pressure state of the first wheel 11 as a reference.

Figure 7E:
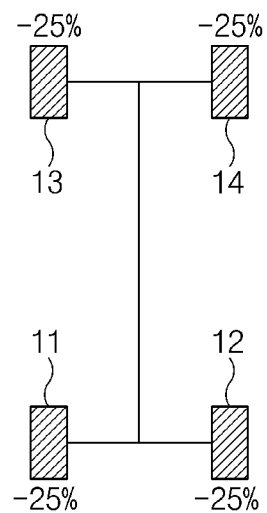

As shown in FIG. 7E, when the tire pressures of the first to fourth wheels 11, 12, 13 and 14 are in the low-pressure states of −25%, the apparatus 100 may confirm the tire low-pressure state of the first wheel 11 from the first sensor value. Further, the apparatus 100 may confirm that wheel speed difference values of the first to fourth wheels 11, 12, 13 and 14 are zero using the tire low-pressure state of the first wheel 11 as a reference. In this case, the apparatus 100 may confirm that the tires of the first to fourth wheels 11, 12, 13 and 14 are all in the low-pressure state.

Figure 8A:
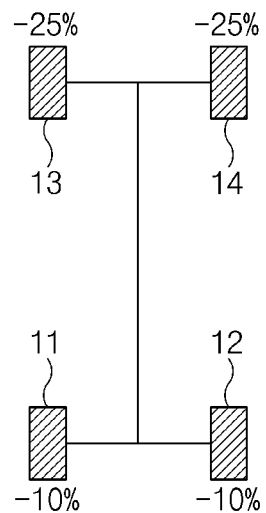
Figure 8B:
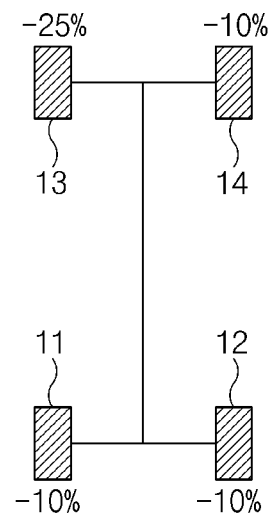
Figure 8C:
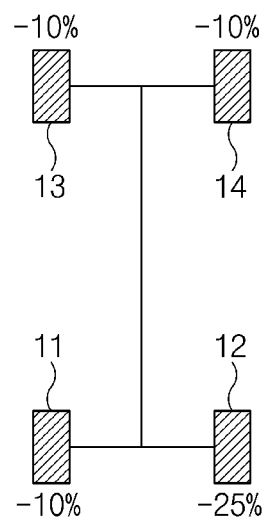

In one example, FIG. 8A to FIG. 8C illustrate some forms in which the first sensor value valid flag is set to ON, and the tire pressure of the first wheel 11 is in the normal state.

First, as shown in FIG. 8A, when the tire pressures of the first and second wheels 11 and 12 are in the normal states of −10%, and the tire pressures of the remaining wheels 13 and 14 are in the low-pressure states of −25%, the apparatus 100 may confirm the normal state of the first wheel 11 from the first sensor value. Further, the apparatus 100 may confirm that the second wheel 12 is in the normal state based on the dynamic radius analysis result of the first to fourth wheels 11, 12, 13 and 14, and the relative wheel speeds of the first and second wheels 11 and 12 using the tire pressure state of the first wheel 11 as a reference. Further, the apparatus 100 may confirm that the third and fourth wheels 13 and 14 are in the tire low-pressure states based on the frequency analysis result of the third and fourth wheels 13 and 14.

Similarly in FIG. 8B, the apparatus 100 may confirm that the third wheel 13 is in the tire low-pressure state based on the frequency analysis result of the third wheel 13.

In one example, as shown in FIG. 8C, when the tire pressures of the first, third, and fourth wheels 11, 13 and 14 are in the normal states of −10%, and the tire pressure of the remaining second wheel 12 is in the low-pressure state of −25%, the apparatus 100 may confirm the normal state of the first wheel 11 from the first sensor value. Further, the apparatus 100 may confirm that the third and fourth wheels 13 and 14 are in the normal states based on the frequency analysis result of the third and fourth wheels 13 and 14. Further, the apparatus 100 may confirm that the second wheel 12 is in the tire low-pressure state based on the dynamic radius analysis result of the first to fourth wheels 11, 12, 13 and 14, and the relative wheel speeds of the first and second wheels 11 and 12 using the tire pressure state of the first wheel 11 as a reference.

An operation flow of the tire pressure monitoring device of the vehicle according to the present disclosure configured as described above will be described in more detail as follows.

FIG. 9 to FIG. 12 illustrate an operation flow for a method for monitoring a tire pressure of a vehicle in some forms of the present disclosure.

Figure 9:
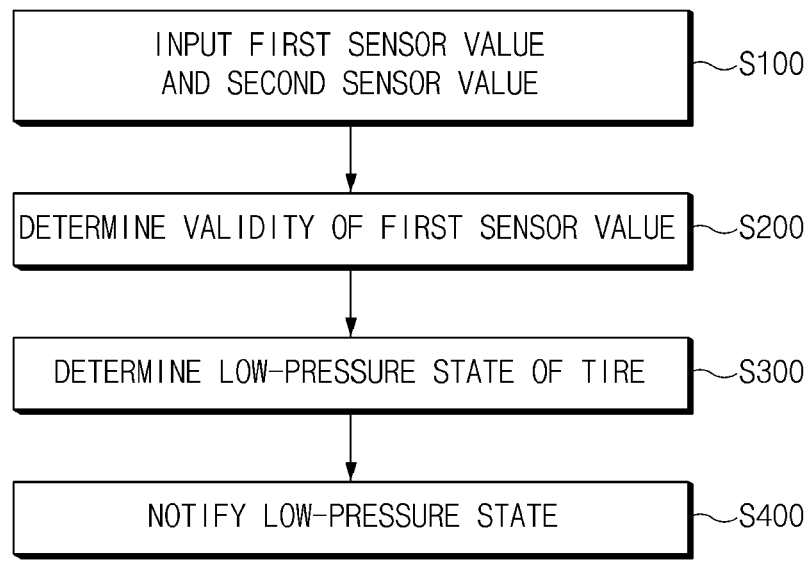
FIG. 9 to FIG. 12 illustrate an operation flow for a method for monitoring a tire pressure of a vehicle in one form of the present disclosure.

With reference to FIG. 9, when the first and second sensor values measured during driving of the vehicle are input (S100), the apparatus 100 determines the validity or invalidity of the first sensor value (S200). A detailed operation of the operation 'S200' is represented with reference to FIG. 10.

Figure 10:
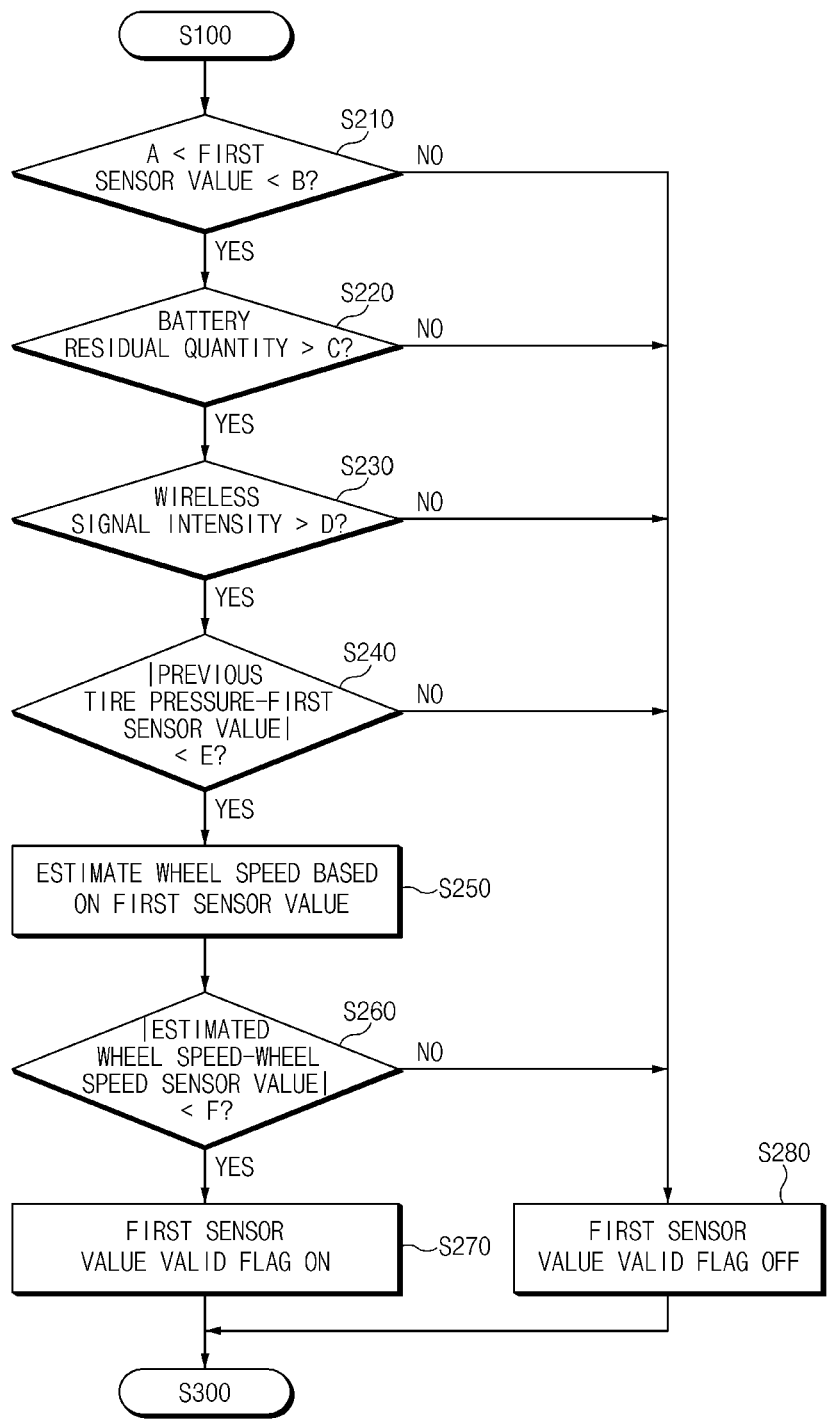

With reference to FIG. 10, the apparatus 100 determines: that the measurement range of the first sensor value is included within a range of a first reference value (A) to a second reference value (B) (S210); that the battery residual quantity is above a third reference value (C) (S220); that the wireless signal intensity is above a fourth reference value (D) (S230); and that the difference value between the previously measured value and the first sensor value is below a fifth reference value (E) (S240). Then, the apparatus 100 estimates the wheel speed based on the first sensor value (S250), and determines that the first sensor value is valid when the difference between the estimated wheel speed and the actual wheel-speed sensor value is below a sixth reference value (F) (S260). In this case, the apparatus 100 sets the first sensor value valid flag to ON (S270).

On the other hand, when a determination result of any one of the operations 'S210' to 'S260' is "NO", the apparatus 100 determines that the first sensor value is invalid. In this case, the apparatus 100 sets the first sensor value valid flag to OFF (S280).

When it is determined that the first sensor value is valid as a result of the determination of the operation 'S200', the apparatus 100 determines whether the tire pressures of the first to fourth wheels are in the low-pressure states based on the first and second sensor values.

Figure 11:
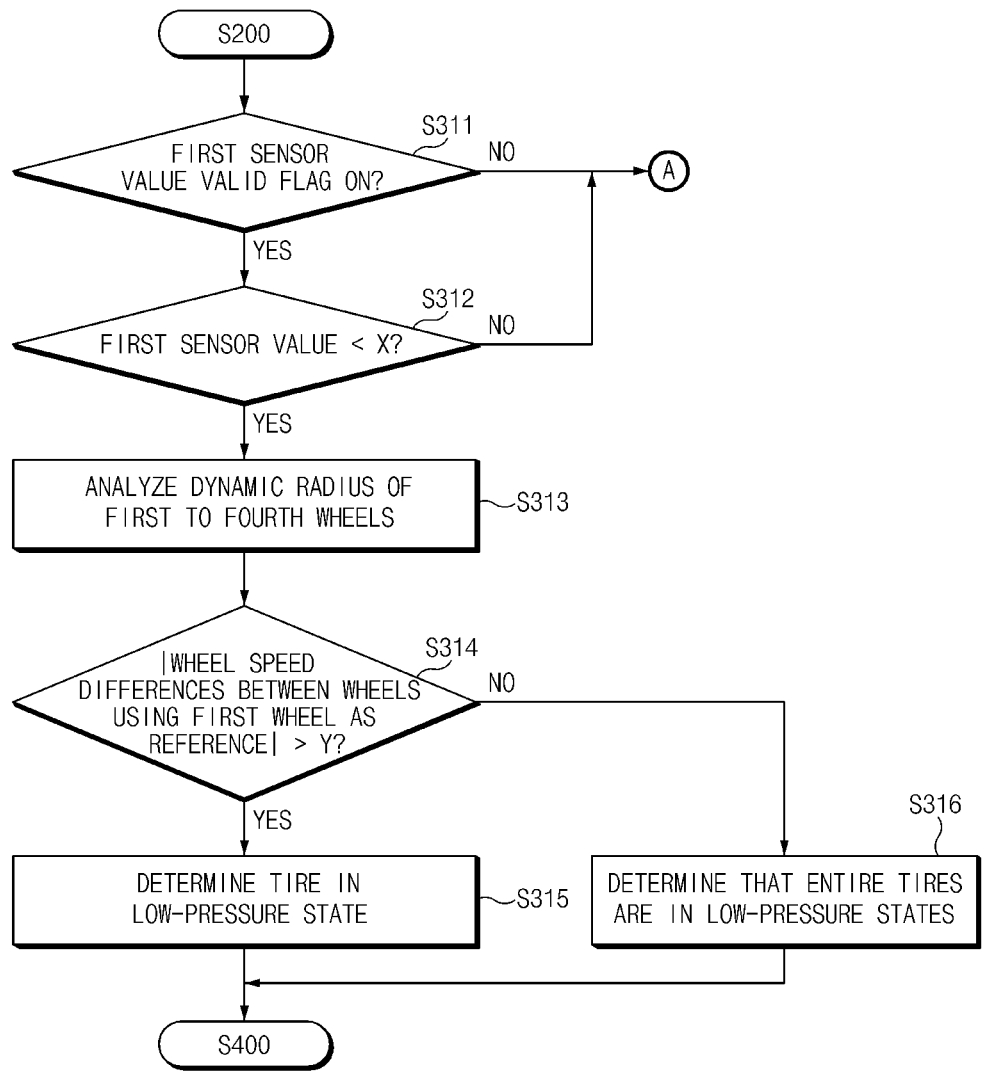
Figure 12:
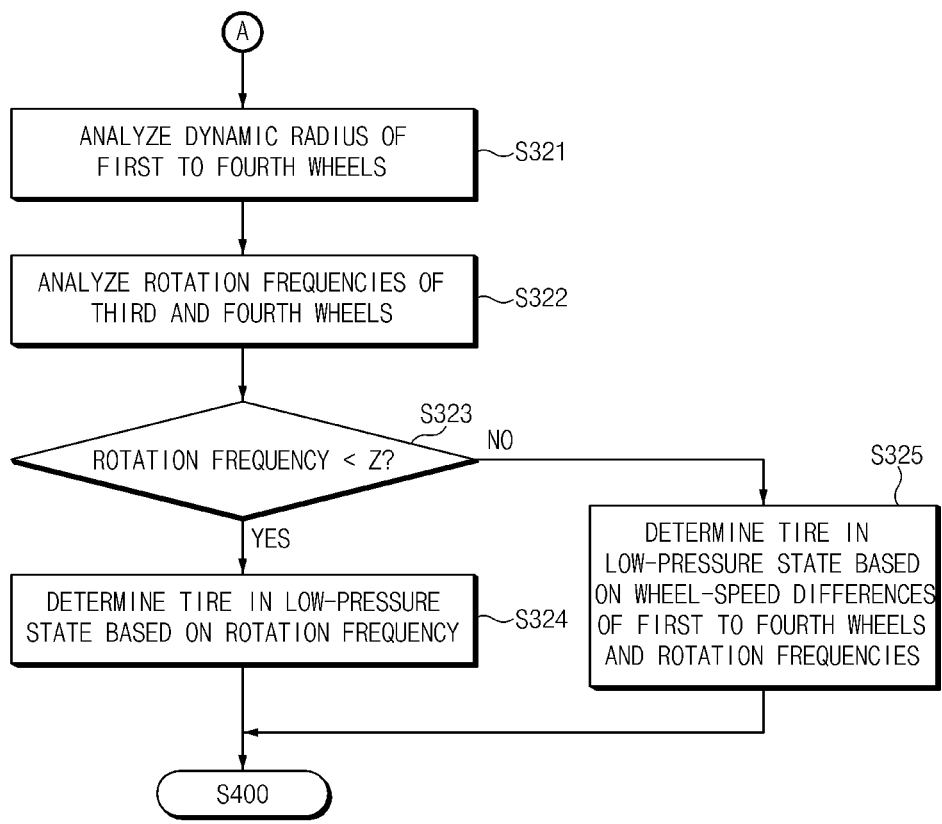

A detailed operation of the operation 'S300' is represented with reference to FIG. 11 and FIG. 12.

With reference to FIG. 11, when the first sensor value valid flag is set on (S311), and when it is confirmed that the first sensor value is below a reference pressure (X) (S312), the apparatus 100 determines the tire in the low-pressure state based on the dynamic radius analysis result of the first to fourth wheels.

In this connection, when the wheel speed differences between the second to fourth wheels are below or equal to a reference wheel speed (Y) using the tire low-pressure state of the first wheel as a reference (S314), the apparatus 100 determines that the entire tires are in the low-pressure states (S316).

On the other hand, when there is a wheel between the second to fourth wheels whose wheel speed difference is equal to or above the reference wheel speed (Y) using the tire low-pressure state of the first wheel as a reference (S314), the apparatus 100 determines the tire in the low-pressure state between the tires of the first to fourth wheels based on the dynamic radius analysis result of the first to fourth wheels (S315).

In one example, when the first sensor value valid flag is set to 'OFF' in the operation 'S311', or it is confirmed that the first sensor value is not below the reference pressure (X) in the operation 'S312', the apparatus 100 allows operations after 'A' to be performed in FIG. 12.

With reference to FIG. 12, the apparatus 100 performs the dynamic radius analysis on the first to fourth wheels (S321), then performs the rotation frequency analysis on the third and fourth wheels (S322).

When it is confirmed that the rotation frequency of the third wheel and/or when the rotation frequency of the fourth wheel is below a reference frequency (Z) as the result of the rotation frequency analysis in the operation 'S322' (S323), the apparatus 100 determines the tire low-pressure state of the corresponding wheel (S324).

Further, the apparatus 100 may determine the tire pressure states of the remaining wheels based on the dynamic radius analysis result of the operation 'S321' based on the tire in the low-pressure state.

In one example, when it is confirmed from the result of the rotation frequency analysis in the operation 'S322' that the rotation frequency of the third wheel and/or the rotation frequency of the fourth wheel is above or equal to the reference frequency (Z) (S323), the apparatus 100 determines that the tire of the corresponding wheel is in the normal state (S325).

Further, the apparatus 100 may determine the tire pressure states of the remaining wheels based on the dynamic radius analysis result of the operation 'S321' using the tire in the normal state as a reference.

When at least one tire low-pressure states of the first to fourth wheels is determined in the operation 'S300', the apparatus 100 outputs the notification and/or the warning for the tire of the corresponding wheel.

Figure 13:
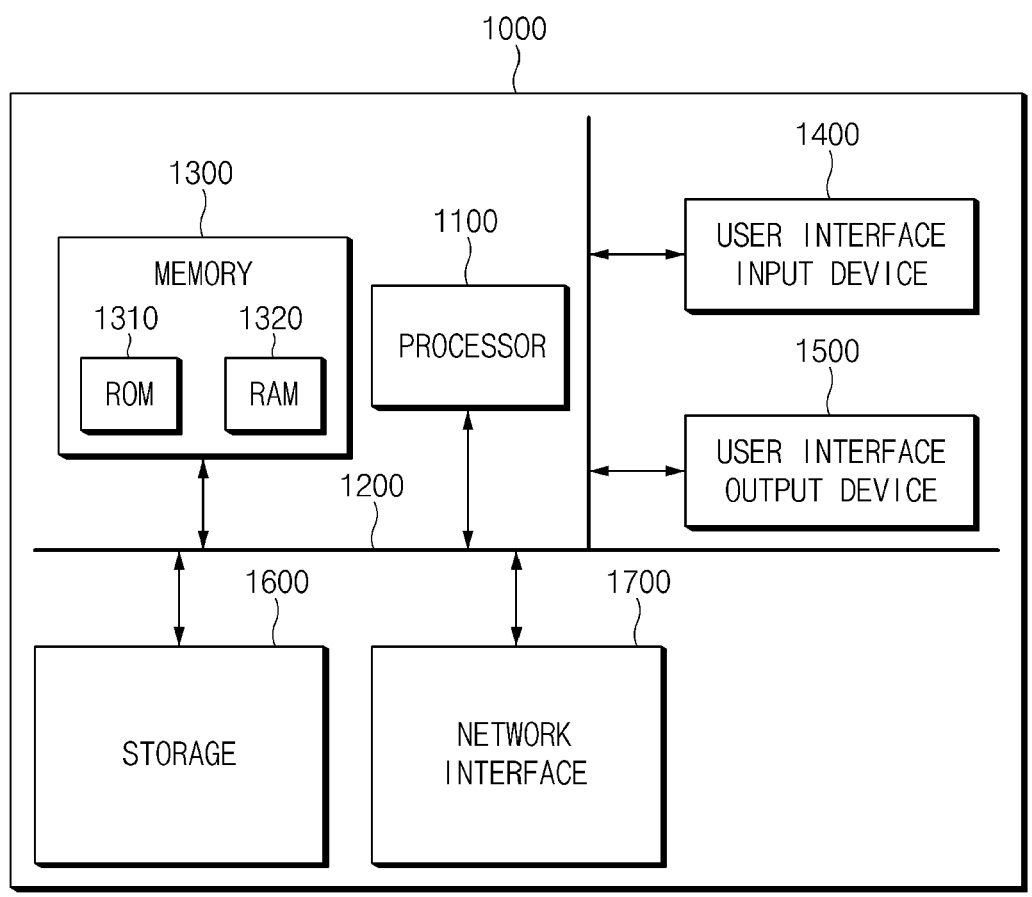
FIG. 13 illustrates a computing system in which a method in one form of the present disclosure is implemented.

FIG. 13 illustrates a computing system in which a method in some forms of the present disclosure is implemented.

With reference to FIG. 13, a computing system 1000 may include at least one processor 1100, a memory 1300, a user interface input device 1400, a user interface output device 1500, storage 1600, and a network interface 1700 connected via a bus 1200.

The processor 1100 may be a central processing unit (CPU) or a semiconductor device that performs processing on commands stored in the memory 1300 and/or the storage 1600. The memory 1300 and the storage 1600 may include various types of volatile or non-volatile storage media. For example, the memory 1300 may include a ROM (Read Only Memory) 1310 and a RAM (Random Access Memory) 1320.

Thus, the operations of the method or the algorithm described in some forms of the present disclosure disclosed herein may be embodied directly in a hardware or a software module executed by the processor 1100, or in a combination thereof. The software module may reside on a storage medium (that is, the memory 1300 and/or the storage 1600) such as a RAM memory, a flash memory, a ROM memory, an EPROM memory, an EEPROM memory, a register, a hard disk, a removable disk, a CD-ROM. The exemplary storage medium is coupled to the processor 1100, which may read information from, and write information to, the storage medium. In another method, the storage medium may be integral with the processor 1100. The processor and the storage medium may reside within an application specific integrated circuit (ASIC). The ASIC may reside within the user terminal. In another method, the processor and the storage medium may reside as individual components in the user terminal.

The description above is merely illustrative of the technical idea of the present disclosure, and various modifications and changes may be made by those skilled in the art without departing from the essential characteristics of the present disclosure.

In some forms of the present disclosure, the low-pressure state of the tire may be accurately monitored at low cost by monitoring the tire pressure using the single tire pressure sensor and the plurality of wheel-speed sensors.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A device for monitoring a tire pressure of a vehicle, the device comprising:
   a first sensor configured to measure a tire pressure of at least one of a first wheel of the vehicle, a second wheel of the vehicle, a third wheel of the vehicle, or a fourth wheel of the vehicle;
   a plurality of second sensors configured to measure wheel speeds of the first wheel, the second wheel, third wheel and the fourth wheel;
   an analysis device configured to analyze the tire pressure of the first wheel, the second wheel, the third wheel, and the fourth wheel based on the tire pressure measured by the first sensor and the wheel speeds measured by the plurality of second sensors;
   a controller configured to determine a tire low-pressure state based on the tire pressure analyzed by the analyzer; and
   a determination device configured to:
      determine whether the measured tire pressure is valid; and
      determine whether the measured tire pressure by the first sensor is valid based on a range of the measured tire pressure, a battery condition of the first sensor, a wireless signal intensity of the first sensor, a difference value between a previously measured tire pressure and the measured tire pressure, and a wheel-speed sensor value.

2. The device of claim 1, wherein the first sensor is disposed on the first wheel and configured to measure the tire pressure of the first wheel.

3. The device of claim 2, wherein the first wheel is one of two rear wheels of the vehicle.

4. The device of claim 1, wherein the plurality of second sensors are disposed on the first wheel, the second wheel, the third wheel, and the fourth wheel and configured to measure the wheel speed of the first wheel, the second wheel, the third wheel, and the fourth wheel.

5. The device of claim 1, wherein the determination device is configured to determine that the measured tire pressure by the first sensor is valid when:
  a measurement range of the measured tire pressure is within a range from a first reference value to a second reference value;
  a battery residual quantity exceeds a third reference value;
  the wireless signal intensity exceeds a fourth reference value;
  the difference value between the previously measured value and the measured tire pressure is below a fifth reference value; and
  a difference between a wheel speed estimated based on a signal of the first sensor and the wheel-speed sensor value is below a sixth reference value.

6. The device of claim 1, wherein the analysis device is configured to:
  compare wheel speed differences in a front and rear direction, a left and right direction, and a diagonal direction among the first wheel, the second wheel, the third wheel, and the fourth wheel; and
  analyze the tire pressure states of the first wheel, the second wheel, the third wheel, and the fourth wheel based on the compared wheel speed differences.

7. The device of claim 1, wherein the analysis device is configured to analyze rotation frequencies of the third wheel and the fourth wheel.

8. The device of claim 1, wherein when the measured tire pressure is determined to be valid, the controller is configured to determine a tire pressure state of the first wheel based on the measured tire pressure.

9. The device of claim 8, wherein when the tire pressure state of the first wheel is determined, the controller is configured to determine the tire pressure states of the second wheel, the third wheel, and the fourth wheel corresponding to the wheel speed differences among the first wheel, the second wheel, the third wheel, and the fourth wheel based on the tire pressure state of the first wheel.

10. The device of claim 1, wherein when the measured tire pressure is determined to be invalid, the controller is configured to determine the tire pressure states of the first wheel, the second wheel, the third wheel, and the fourth wheel based on:
  the wheel speed differences among the first wheel, the second wheel, the third wheel, and the fourth wheel; and
  the rotation frequencies of the third wheel and the fourth wheel.

11. The device of claim 1, wherein the device further comprises:
  output configured to output the tire low-pressure state of a corresponding wheel when a tire of at least one of the first wheel, the second wheel, the third wheel, and the fourth wheel is determined to be in a low-pressure state.

12. A method for monitoring a tire pressure of a vehicle, the method comprising:
  measuring, by a first sensor, a tire pressure of at least one of a first wheel, a second wheel, a third wheel, or a fourth wheel;
  measuring, by a plurality of second sensors, wheel speeds of the first wheel, the second wheel, the third wheel and the fourth wheel;
  analyzing, by an analyzer, the tire pressure of the first wheel, the second wheel, the third wheel and the fourth wheel based on the tire pressure measured by the first sensor and the wheel speeds measured by the plurality of second sensors;
  determining, by a controller, a tire low-pressure state based on the tire pressure analyzed by the analyzer; and
  determining, by a determining device, whether the measured tire pressure by the first sensor is valid based on a range of the measured tire pressure, a battery condition of the first sensor, a wireless signal intensity of the first sensor, a difference value between a previously measured tire pressure and the measured tire pressure, and a wheel-speed sensor value.

13. The method of claim 12, wherein analyzing the tire pressure of the first wheel, the second wheel, the third wheel and the fourth wheel further comprises:
  comparing, by the analyzer, wheel speed differences in a front and rear direction, a left and right direction, and a diagonal direction among the first wheel, the second wheel, the third wheel, and the fourth wheel; and
  analyzing, by the analyzer, the tire pressure states of the first wheel, the second wheel, the third wheel, and the fourth wheel based on the compared wheel speed differences.

14. The method of claim 12, wherein analyzing the tire pressure of the first wheel, the second wheel, the third wheel, and the fourth wheel further comprises:
  analyzing, by the analyzer, rotation frequencies of the third wheel and the fourth wheel.

15. The method of claim 12, wherein determining the tire low-pressure state further comprises:
  when the measured tire pressure is determined to be valid, determining, by the controller, the tire pressure state of the first wheel based on the measured tire pressure; and
  determining, by the controller, the tire pressure states of the second wheel, the third wheel, and the fourth wheel based on the wheel speed differences among the first wheel, the second wheel, the third wheel, and the fourth wheel based on the tire pressure state of the first wheel.

16. The method of claim 12, wherein determining the tire low-pressure state further comprises:
  determining, by the controller, the tire pressure states of the first wheel, the second wheel, the third wheel and the fourth wheel based on:
    the wheel speed differences among the first wheel, the second wheel, the third wheel and the fourth wheel; and
    the rotation frequencies of the third wheel and the fourth wheel when the measured tire pressure is determined to be invalid.

17. The method of claim 12, wherein the method further comprises:
  when a tire of at least one of the first wheel, the second wheel, the third wheel, and the fourth wheel is determined to be in a low-pressure state, outputting, by an output, the tire low-pressure state of a corresponding wheel.

* * * * *